US010282444B2

United States Patent
Bozkaya et al.

(10) Patent No.: US 10,282,444 B2
(45) Date of Patent: May 7, 2019

(54) DISAMBIGUATING JOIN PATHS FOR NATURAL LANGUAGE QUERIES

(71) Applicant: Google LLC, Mountain View, CA (US)

(72) Inventors: Tolga Bozkaya, Belmont, CA (US); Armand Joseph Dijamco, San Francisco, CA (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 15/261,556

(22) Filed: Sep. 9, 2016

(65) Prior Publication Data

US 2017/0075891 A1    Mar. 16, 2017

Related U.S. Application Data

(60) Provisional application No. 62/217,409, filed on Sep. 11, 2015.

(51) Int. Cl.
*G06F 17/30* (2006.01)

(52) U.S. Cl.
CPC .... *G06F 17/3043* (2013.01); *G06F 17/30401* (2013.01); *G06F 17/30554* (2013.01); *G06F 17/30654* (2013.01)

(58) Field of Classification Search
CPC .......... G06F 17/3043; G06F 17/30554; G06F 17/30654; G06F 17/304; G06F 17/30401
USPC .......................................................... 707/722
See application file for complete search history.

(56) References Cited

U.S. PATENT DOCUMENTS

| | | | | |
|---|---|---|---|---|
| 5,197,005 A | * | 3/1993 | Shwartz | G06F 17/30401 |
| 5,454,106 A | * | 9/1995 | Burns | G06F 17/30392 |
| 5,848,406 A | * | 12/1998 | Mani | G06F 17/30392 |
| 5,873,075 A | | 2/1999 | Cochrane et al. | |
| 6,460,029 B1 | * | 10/2002 | Fries | G06F 17/30654 |
| 6,643,636 B1 | | 11/2003 | Au et al. | |
| 6,665,640 B1 | | 12/2003 | Bennett et al. | |

(Continued)

OTHER PUBLICATIONS

Bobed et al., "QueryGen: Semantic Interpretation of Keyword Queries Over Heterogeneous Information Systems", Information Sciences 329 (2016): pp. 412-433, available online Sep. 25, 2015. (Year: 2015).*

(Continued)

*Primary Examiner* — Phuong Thao Cao
(74) *Attorney, Agent, or Firm* — Fish & Richardson P.C.

(57) ABSTRACT

One of the methods includes, obtaining a natural language query from a user; while converting the natural language query into structured operations to be performed on structured application programming interfaces (APIs) of a knowledge base: responsive to detecting a linguistic ambiguity associated with the converting, wherein the linguistic ambiguity identifies two or more interpretations of a word included in the natural langue query: resolving the linguistic ambiguity by selecting an interpretation of the word, from the two or more interpretations of the word, based on one or more join paths that have been generated based on a data schema of the knowledge base; modifying the converting in accordance with the selected interpretation of the word, to generate one or more structured operations; performing the one or more structured operations on the structured APIs of the knowledge base; and returning search results matching the natural language query results to the user.

20 Claims, 9 Drawing Sheets

(56) References Cited

U.S. PATENT DOCUMENTS

| | | | |
|---|---|---|---|
| 6,701,294 B1* | 3/2004 | Ball | G06F 17/30392 704/257 |
| 6,714,939 B2* | 3/2004 | Saldanha | G06F 17/2229 |
| 7,027,974 B1 | 4/2006 | Busch et al. | |
| 7,136,854 B2* | 11/2006 | Smith | G06F 17/30427 |
| 7,263,517 B2 | 8/2007 | Shen et al. | |
| 7,324,936 B2* | 1/2008 | Saldanha | G06F 17/2229 704/1 |
| 7,430,562 B1 | 9/2008 | Bedell et al. | |
| 7,596,568 B1* | 9/2009 | McConnell | G06F 17/30672 |
| 7,630,967 B1* | 12/2009 | Srivastava | G06F 17/30442 |
| 8,818,795 B1* | 8/2014 | Cassimatis | G06F 17/2785 704/9 |
| 8,949,170 B2* | 2/2015 | Zadeh | G06N 7/02 706/48 |
| 8,949,264 B2* | 2/2015 | Cohen | G06F 17/30401 707/760 |
| 9,183,511 B2* | 11/2015 | Li | G06N 5/02 |
| 2005/0050042 A1* | 3/2005 | Elder | G06F 17/3043 |
| 2005/0197828 A1* | 9/2005 | McConnell | G06F 17/241 704/9 |
| 2005/0256889 A1* | 11/2005 | McConnell | G06F 17/30286 |
| 2008/0126080 A1* | 5/2008 | Saldanha | G06F 17/2229 704/9 |
| 2008/0235203 A1* | 9/2008 | Case | G06F 17/3064 |
| 2009/0150156 A1* | 6/2009 | Kennewick | G06Q 30/0261 704/257 |
| 2009/0192968 A1* | 7/2009 | Tunstall-Pedoe | G06N 5/02 706/47 |
| 2010/0005081 A1* | 1/2010 | Bennett | G06F 17/27 704/9 |
| 2010/0121837 A1 | 5/2010 | Vergnory-Mion et al. | |
| 2010/0274785 A1* | 10/2010 | Procopiuc | G06F 17/30312 707/737 |
| 2010/0299139 A1* | 11/2010 | Ferrucci | G06F 17/30654 704/9 |
| 2011/0307435 A1* | 12/2011 | Overell | G06F 17/278 706/46 |
| 2012/0016678 A1* | 1/2012 | Gruber | G06F 17/3087 704/275 |
| 2012/0036145 A1* | 2/2012 | Tunstall-Pedoe | G06F 17/30654 707/760 |
| 2013/0080472 A1* | 3/2013 | Cohen | G06F 17/30401 707/794 |
| 2013/0198219 A1* | 8/2013 | Cohen | G06F 17/30401 707/760 |
| 2013/0226846 A1* | 8/2013 | Li | G06N 5/02 706/12 |
| 2013/0262107 A1* | 10/2013 | Bernard | G06F 17/2785 704/235 |
| 2013/0262361 A1* | 10/2013 | Arroyo | G06N 5/02 706/46 |
| 2013/0275164 A1* | 10/2013 | Gruber | G10L 17/22 705/5 |
| 2014/0136188 A1* | 5/2014 | Wroczynski | G06F 17/2872 704/9 |
| 2014/0149446 A1* | 5/2014 | Kuchmann-Beauger | G06F 17/30389 707/763 |
| 2014/0180728 A1* | 6/2014 | Biddle | G06F 17/30654 705/4 |
| 2014/0201241 A1* | 7/2014 | Wood | G06F 17/30401 707/772 |
| 2014/0379615 A1* | 12/2014 | Brigham | G06N 99/005 706/11 |
| 2014/0379753 A1* | 12/2014 | Roit | G06F 17/30401 707/771 |
| 2015/0019535 A1* | 1/2015 | Weber | G06F 17/30554 707/722 |
| 2015/0026153 A1* | 1/2015 | Gupta | G06F 17/30336 707/711 |
| 2015/0100943 A1* | 4/2015 | Gabel | G06O 30/02 717/106 |
| 2015/0324422 A1* | 11/2015 | Elder | G06F 17/279 707/722 |
| 2015/0382047 A1* | 12/2015 | Van Os | G06F 17/3084 725/38 |
| 2016/0357851 A1* | 12/2016 | Perkins | G06F 17/30613 |
| 2017/0026705 A1* | 1/2017 | Yeh | G06F 17/278 |
| 2017/0116260 A1* | 4/2017 | Chattopadhyay | G06F 17/30401 |
| 2017/0199928 A1* | 7/2017 | Zhao | G06F 17/30654 |
| 2017/0213157 A1* | 7/2017 | Bugay | G06N 99/005 |

OTHER PUBLICATIONS

Chang et al., "Translation of Fuzzy Queries for Relational Database System", IEEE Transactions on Pattern Analysis and Machine Intelligence, vol. PAMI-1, No. 3, Jul. 1979, pp. 281-294. (Year: 1979).*

Hirst, G., "Semantic Interpretation and Ambiguity", Artificial Intelligence 34 (1988): pp. 131-177. (Year: 1988).*

Li et al., "Constructing an Interactive Natural Language Interface for Relational Databases", in Proceedings of the VLDB Endowment, vol. 8, Issue 1, Sep. 2014, pp. 73-84. (Year: 2014).*

Extended European Search Report in European Application No. 16188191.7, dated Feb. 2, 2017, 11 pages.

EP Office Action issued in European Application No. 16188191.7, dated Aug. 7, 2018, 6 pages.

* cited by examiner

102

Table: FactoryToConsumer (
    date_id,
    manufacture_country_code,
    sale_country_code,
    sales_usd,
    production_cost_usd)

104

Table : Geo (
    country_code,
    country_name,
    region)

106

Potential joins:
FactoryToConsumer.manufacture_country_code joins to Geo.country_code
FactoryToConsumer.sale_country_code joins to Geo.country_code

FIG. 1

```
200
  202  subcontext: {
         name: "sale"
         ngram: "sold"
         attribute_name: "sale_country_code"
         attribute_name: "sales_usd"
       }

204  subcontext {
         name: "manufacturer"
         ngram: "produced"
         ngram: "manufactured"
         attribute_name: "production_cost"
         attribute_name: "manufacture_country_code"
       }
```

FIG. 2

400 node { node_index: 0 node_name: "FactoryToConsumer::date_id_int" } node { node_index: 1 node_name: "FactoryToConsumer::manufacture_country_code" } node { node_index: 2 node_name: "FactoryToConsumer::sale_country_code" } node { node_index: 3 node_name: "FactoryToConsumer::sales_usd" } node { node_index: 4 node_name: "FactoryToConsumer::production_cost" } node { node_index: 5 node_name: "FactoryToConsumer::sale_country_code Geo::country_name" } node { node_index: 6 node_name: "FactoryToConsumer::sale_country_code Geo::region_name" } node { node_index: 7 node_name: "FactoryToConsumerl::manufacture_country_code Geo::country_name" } node { node_index: 8 node_name: "FactoryToConsumer::manufacture_country_code Geo::region_name" } edge {
edge_index: 0
node_name: "FactoryToConsumer"
nodes: [0,1,2,3,4]
} edge {
edge_index: 1
node_name: "FactoryToConsumer::sale_country_code Geo"
nodes: [2,5,6]
} edge {
edge_index: 2
node_name: "FactoryToConsumer::manufacture_country_code Geo"
nodes: [1,7,8]
}

FIG. 4

BuyerSeller Table
Attributes:

| Attribute | Recognized phrases |
|---|---|
| sales_usd | sale |
| transaction_date | transaction date |
| transaction_item | item |
| seller_id | |
| buyer_id | |

Subcontexts:

| Subcontext | Attributes in Subcontext | Recognized phrases for subcontext |
|---|---|---|
| buyer | buyer_id | buyer |
| seller | seller_id | seller |

Joins:

| Foreign Key | Parent/Lookup/Primary Table | Parent/Lookup/Primary Key |
|---|---|---|
| buyer_id | Person | person_id |
| seller_id | Person | person_id |

FIG. 7

Person Table

Attributes:

| Attribute | Recognized phrases |
|---|---|
| full_name | name |
| likes | likes |
| person_id | |
| business_address_id | |
| personal_address_id | |

Subcontexts:

| Subcontext | Attributes in Subcontext | Recognized phrases for subcontext |
|---|---|---|
| business_address | business_address_id | business address |
| personal_address | personal_address_id | personal address |

Joins:

| Foreign Key | Parent/Lookup/Primary Table | Parent/Lookup/Primary Key |
|---|---|---|
| business_address_id | Address | address_id |
| personal_address_id | Address | address_id |

Address Table

Attributes:

| Attribute | Recognized phrases |
|---|---|
| address_id | |
| state | state |

FIG. 8

DISAMBIGUATING JOIN PATHS FOR NATURAL LANGUAGE QUERIES

CROSS-REFERENCE TO RELATED APPLICATIONS

This application claims the benefit under 35 U.S.C. § 119(e) of the filing date of U.S. Provisional Patent Application Ser. No. 62/217,409, for "Disambiguating Join Paths for Natural Language Queries," which was filed on Sep. 11, 2015, which is incorporated here by reference.

BACKGROUND

This specification relates to disambiguating join paths for natural language queries.

Discerning the linguistic context in which a natural language query is made can improve query processing. For example, the query "calculate the sales of goods produced in Italy" may be interpreted as "calculate the sales made in Italy of goods that have been produced" or "calculate the sales of goods that have been produced in Italy." The context in which this query was issued may be helpful to understand the intended interpretation.

SUMMARY

In general, this specification describes technologies for disambiguating join paths for natural language queries.

In general, one innovative aspect of the subject matter described in this specification can be embodied in methods that include the actions of, obtaining a natural language query from a user; while converting the natural language query into structured operations to be performed on structured application programming interfaces (APIs) of a knowledge base: responsive to detecting a linguistic ambiguity associated with the converting, wherein the linguistic ambiguity identifies two or more interpretations of a word included in the natural langue query: resolving the linguistic ambiguity by selecting an interpretation of the word, from the two or more interpretations of the word, based on one or more join paths that have been generated based on a data schema of the knowledge base; modifying the converting in accordance with the selected interpretation of the word, to generate one or more structured operations; performing the one or more structured operations on the structured APIs of the knowledge base; and returning search results matching the natural language query results to the user.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The join path includes identifiers of at least two tables that share a common column. The join path further includes one or more identifiers of the common column. Resolving the linguistic ambiguity by selecting an interpretation of the word, from the two or more interpretations of the word, based on one or more join paths that have been generated based on a data schema of the knowledge includes: determining that the word matches a value specified in a first column of a first table in the at least two tables; and based on the determining, identifying the word as referring to a value specified in a second column of a second table in the at least two tables. Converting the natural language query into structured operations to be performed on structured application programming interfaces (APIs) of a knowledge base includes: obtaining parser output generated by a parser, the output representing the natural language query; and generating a concept tree in accordance with the parser output, wherein subcontext concept nodes are located on a level of the concept tree that is no closer to the root of the concept tree than any attribute node is. Obtaining parser output includes processing the natural language query into tokens. The structured operations are generated based on the concept tree and the selected interpretation of the word.

The subject matter described in this specification can be implemented in particular embodiments so as to realize one or more of the following advantages. The amount of computational effort required to resolve natural language ambiguity can be reduced. Ambiguities present in a natural language query can be resolved automatically based on a predefined context and thus do not require user intervention. Also, linguistic ambiguities detected in a user-provided natural language query can be resolved as they arise, eliminating the need to produce search results based on each alternative interpretation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram illustrating example data tables and potential joins between the data tables.

FIG. 2 is a block diagram illustrating example subcontext lexicons.

FIG. 4 is a block diagram illustrating an example representation of the hypergraph show in FIG. 3.

FIGS. 7-8 are block diagram illustrating example schema lexicons.

Like reference numbers and designations in the various drawings indicate like elements.

DETAILED DESCRIPTION

Figure 3:
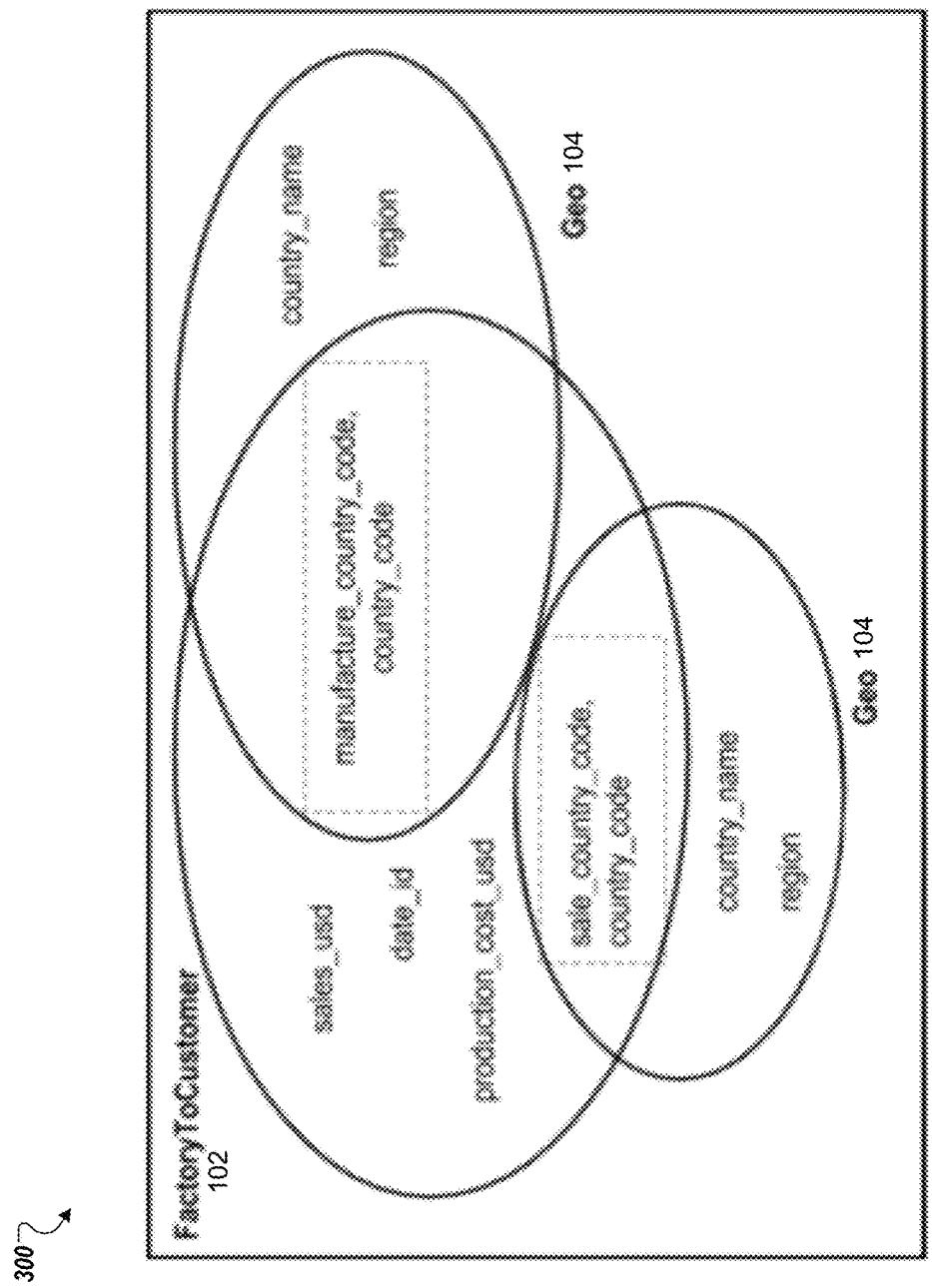
FIG. 3 is a block diagram illustrating an example hypergraph.

A natural language query processing system can use natural language processing (NLP) techniques to generate, based on natural language queries, structured queries operable on an underlying data source and execute the structured queries to obtain query results. To this end, one or more of the following collections of information, which are referred to as schema lexicons in this specification, may need to be specified, e.g., by a domain expert:

- mappings between the data schema of the underlying data source, e.g., column names, and tokens, e.g., words or phrases, produced from a natural language query;
- join mappings between data tables, e.g., which column in table A joins with the "country" column in table B;
- recognizable domain values; e.g., the word "Italy" should be recognized as a country; and
- mappings between query filters and words included in natural language queries; e.g., to which one or more country filters, the phrase "G20 countries" in the query "what is the revenue in G20 countries" refers.

Based on these schema lexicons, after receiving a natural language query, a query processing system can identify tokens in the query, e.g., by parsing the query using a parser, and map tokens to concepts based on schema lexicons.

The parser can specify dependency relationships among the identified tokens, e.g., using a concept tree. The parser output can therefore include a concept tree having recognized concepts as nodes.

The system can analyze the concept tree to generate structured queries, e.g., SQL queries, and execute these structured queries on the underlying data source to obtain search results.

Ambiguities may arise out of processing a natural language query. For example, an ambiguity may arise when a word included in natural language query can be interpreted as referring to two different recognizable schema lexicons, e.g., to values included in different columns of different tables. This specification describes techniques for detecting the ambiguities as they arise. Thus, ambiguities can be addressed prior to submitting a structured query to obtain search results. This can improve performance and reduce the time needed to provide results corresponding to the intent of the user. For example, multiple structured queries do not need to be generated as the input query is revised one or more times by the user to remove ambiguity in response to results being generated based on the ambiguous natural language query. In some implementations, the ambiguities can be resolved based on one or more algorithms described herein and without user intervention simplifying the process and streamlining the user experience.

For example, after receiving the query "calculate the sales of goods produced in Italy" a natural language system may generate the following three tokens: "sales," "Italy," and "produced." Tokens determined by the natural language system to match schema lexicons are recognized as concepts. For example, the system may recognize the "sales" as a concept referring to the "sales_usd" column of the table 102 shown in FIG. 1; the concept "Italy," as an inverted index match for a country name; and the concept "produced" as an n-gram included in subcontext 204 shown in FIG. 2; and therefore the system identifies the query as including three concepts.

However, the system may determine that the concept for the country "Italy" is ambiguous, because the concept "Italy" could be interpreted as either the country in which the sales were made or the country in which the goods were produced or manufactured. The system may therefore require additional context to disambiguate.

The additional context can be another concept produced from the same natural language query that matches values specified in a particular subcontext.

For example, because the concept "produced" matches one of the n-grams included in subcontext 204, as shown in FIG. 2, the system may rely on other n-grams included in the subcontext 204, e.g., the "production_ost" n-gram and the "manufacture_country_code" n-gram, to resolve the ambiguity relating to the concept "Italy." For example, when two interpretations are otherwise equally possible or even plausible, the system will rely on data specified in one or more subcontext to select an interpretation and resolves a natural language query based on the selected interpretation. Thus, the system will interpret the concept "Italy" as the country in which the goods were produced or manufactured, because the concept "produced" has an n-gram match in the subcontext 204, but not in the subcontext 202.

Hypergraph Generation Based on Data Schemas and Join Mappings

Subcontexts based on which disambiguation can be done are generated based on a hypergraph, which represents a database schema where data tables may have multiple join mappings among themselves. In some implementations, subcontexts are created by a domain expert, as part of the schema lexicons, to specify relationships of data within a particular domain. A hypergraph includes a set of nodes representing columns of data tables stored in a database, as well as a set of edges representing tables to which the columns belong. Two nodes are connected by an edge if the columns represented by the two nodes are joinable; and the edge identifies the tables to which the columns belong.

Join Lineage for a table is a chain of joins that lead to the table starting from another table. There may be multiple join lineages possible between two tables. If there is a join mapping (A, x, B, y) specified between A and B then the join lineage starting from A to B can be represented as "A::x B"

A hyperedge includes: a table name, a join lineage, and a list of hypernodes (by reference or index). A node includes: a table name, an attribute name, and {a join lineage with the attribute name}, which is also called an attribute path.

In the example tables shown in FIG. 1, the sale_country_code column in the FactoryToConsumer table 102 may be joined with the country_code column in the Geo table 104, and therefore these two columns are represented by a same node on a hypergraph; as are the manufacture_country_code column in the FactoryToConsumer table 102 and the country_code column in the Geo table 104. In other words, tables that can be joined through one or more common columns are represented by hyperedges whose node sets overlap on the common columns.

When two tables can be joined through two or more common columns, however, several instances of the table including the two or more common columns are needed to construct a hypergraph.

For example, as shown in FIG. 1, the Geo table 104 can be joined with the FactoryToConsumer table 102 in the following two ways: through the manufacture_country_code foreign key and the through the sale_country_code foreign key. The hypergraph 300 describing the FactoryToConsumer table 102 and the Geo table 104 therefore includes two instances of the Geo table 104, as shown in FIG. 3.

Because there are two instances of the Geo table 104 in the hypergraph 300, a natural language processing system needs to distinguish them from each other when processing natural language queries. The disambiguation technologies described in this specification use join paths from source tables. Alternatively, the disambiguation can be done by referring to table names.

A source table is a table that is not the primary table in any join mappings. In other words, a source table is joined with another table through one or more of its foreign keys, but not its primary key. In the example above, the FactoryToCustomer table is a source table and the Geo table is not a source table as the tables are joined on the manufacture_country_code column and the sale_country_code column, neither of which is a primary key, of the FactoryToConsumer table and the country_code column, which is a primary key, of the Geo table.

A join path is a linear structure, e.g., a string or a list, that describes how to reach a given table from a source table by following foreign_key-primary_key join mappings, e.g., in the form of: [<table name>::<foreign_key>]*<table_name>. The "*" represents that [<table_name>::<foreign_key>] can repeat more than one time. The join paths for the two Geo table instances shown in FIG. 3 are:

"FactoryToConsumer::sale_country_code Geo"; and
"FactoryToConsumer::manufacture_country_code Geo."

Join paths can also be used to describe a hypergraph's nodes, e.g., common or joinable columns across two tables. For example, the join paths for the "FactoryToConsumer::sale_country_code Geo" edge are as follows:

"FactoryToConsumer::sale_country_code Geo::country_code";
"FactoryToConsumer::sale_country_code Geo::country_name"; and
"FactoryToConsumer::sale_country_code Geo::country_region."

An example algorithm for generating join paths follows:
1. current_tables={Set of (table, join lineage) pairs for tables that do not appear as the Parent table for any join mappings}. The "join lineage"s for these tables match the table. Ex: [(BuyerSeller, "BuyerSeller")]
2. While current_tables is not empty:
   a. Dequeue (T, T.join_lineage) from current_tables.
   b. Create a hyperedge for this table "instance" and add it to the hypergraph. Hyperedge(T, T.join_lineage, hypernodes={ })
   c. For table T, find all columns that do not appear as a primary key in any join mappings. For each such column T.c, create a hypernode and add it to the hypergraph. Note that we are seeing these attributes for the first time and that is why we create nodes for them. The hypernodes will also be added to the list of hypernodes for the hyperedge created in the step above.
   d. For table T, find all columns that do appear as a primary key in any join mappings. We have basically created hypernodes for these when we were processing the previous table in the join lineage. We just add references of these existing hypernodes to the list of hypernodes for the hyperedge created in the step above.
   e. For All Join Mappings (FT, fk, PT, pk) where FT=T: Enqueue (PT, Append(T.join_lineage, "::fk PT") to current_tables.

The example algorithm above will conclude unless there are cyclic join relationships. A cyclic join relationship can easily be detected by checking if a table already appears in the join path. A predefined number of cycles may also be allowed when constructing join path without causing the algorithm to hang.

Below is an output of the above example algorithm, using, as input, the schema lexicons shown in FIGS. 7-8.
1. current_tables={(BuyerSeller, "BuyerSeller")}, Hyperedges={ }, Hypernodes={ }
2. After processing (BuyerSeller, "BuyerSeller"):
   a. New Hyperedges:
      i. E1(BuyerSeller, "BuyerSeller", {N1,N2,N3,N4,N5})
   b. New Hypernodes:
      i. N1(BuyerSeller, sales_usd, "BuyerSeller::sales_usd")
      ii. N2(BuyerSeller, transaction_item, "BuyerSeller::transaction_item")
      iii. N3(BuyerSeller, transaction_date, "BuyerSeller::transaction_date")
      iv. N4(BuyerSeller, buyer_id, "BuyerSeller::buyer_id")
      v. N5(BuyerSeller, seller_id, "BuyerSeller::seller_id")
   c. current_tables
      i. (Person, "BuyerSeller::buyer_id Person")
      ii. (Person, "BuyerSeller::seller_id Person")
3. After processing (Person, "BuyerSeller::buyer_id Person")
   a. New Hyperedges:
      i. E1(Person, "BuyerSeller::buyer_id Person", {N4, N6, N7, N8, N9}) (Note that N4 was created earlier for BuyerSeller. that is the join key)
   b. New Hypernodes:
      i. N6(Person, full_name, "BuyerSeller::buyer_id Person::full_name")
      ii. N7(Person, likes, "BuyerSeller::buyer_id Person::likes")
      iii. N8(Person, personal_address_id, "BuyerSeller::buyer_id Person::personal_address_id")
      iv. N9(Person, business_address_id, "BuyerSeller::buyer_id Person::business_address_id")
   c. current_tables
      i. (Person, "BuyerSeller::seller_id Person")
      ii. (Address, "BuyerSeller::buyer_id Person::personal_address_id Address")
      iii. (Address, "BuyerSeller::buyer_id Person::business_address_id Address")

A natural language query processing system may generate the hypergraph 400 shown in FIG. 4 from the data schema 100 shown in FIG. 1.

ANALYSIS OF SUBCONTEXT

Subcontext Concept Transformations

Once a hypergraph is generated, a natural language query processing system can analyze subcontexts specified in domain lexicons associated with a particular domain and propagate join paths through the subcontexts.

One of the challenges in processing natural language queries arises from the elasticity of the natural language, because it is possible to express the same meaning in many different linguistic ways. This may complicate the dependency relationship analysis. For example, a natural language processing system may generate the same concepts from phrases or words included in a natural langue query, but the dependency relationships between these concepts may differ, depending on how the natural language query is parsed by a parser. Further, because a natural language query process system may rely on parsing output, e.g., concept trees, provided by an external parser and have no control over the operations of the external parser, the system needs to transform parser output that it receives into a form that can be processes by the system in order to propagate join paths.

To this end, a natural language query processing system may use heuristics or transformation rules to transform a concept tree in order to produce a concept tree having a structure that can be processed by the system to generate join paths.

For example, the following natural language queries carry the same meaning:
1. compute sales where buyer's personal address is in Nevada
2. compute sales where buyer has his personal address in Nevada; and
3. what is the total sales for buyers who have their personal address in Nevada.

Figure 5:
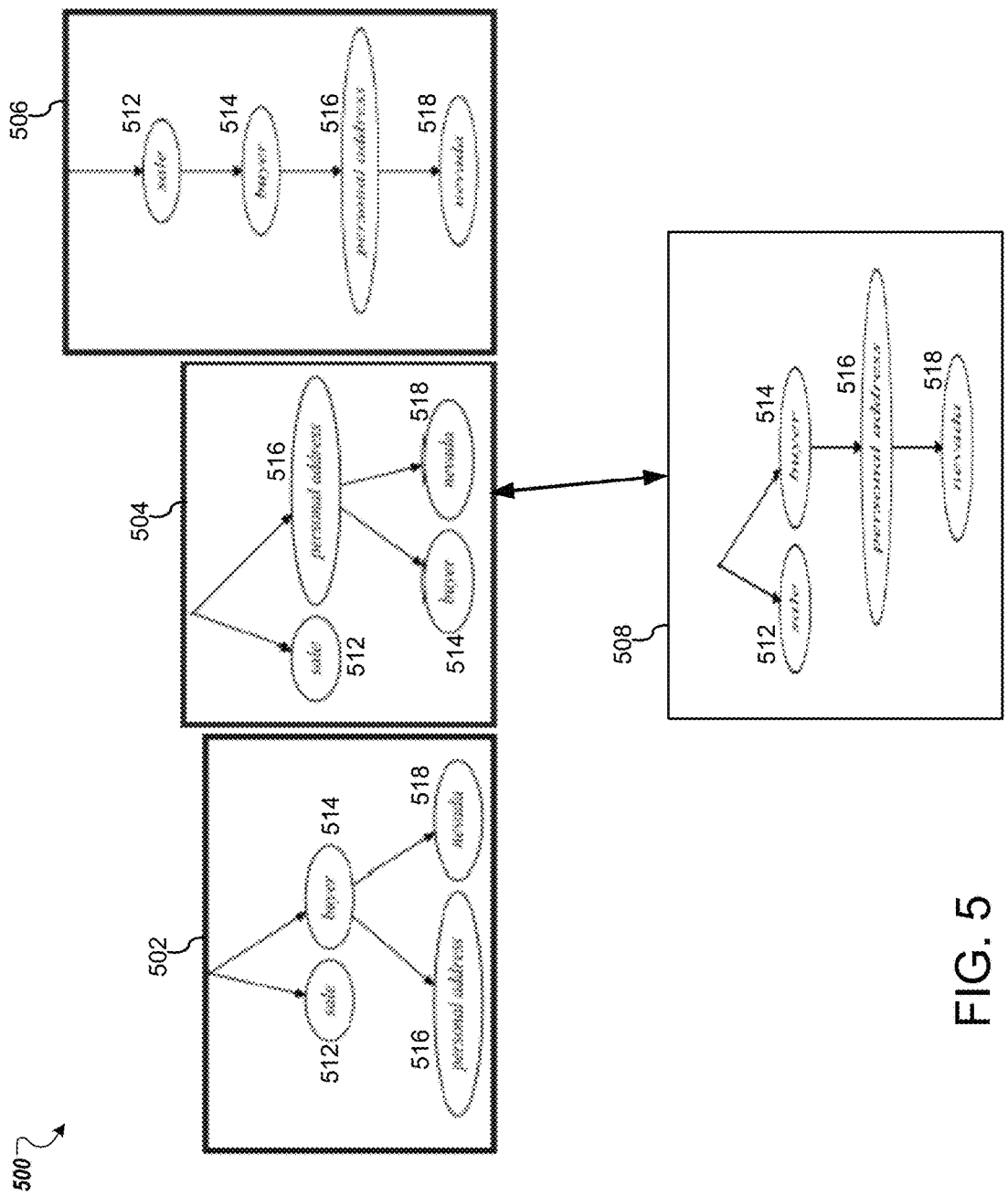
FIG. 5 is a block diagram illustrating example concept trees.

FIG. 5 is a block diagram 500 illustrating example concept trees 502, 504, and 506. In particular, a parser may produce the three concept trees 502, 504, and 506 from the three natural language queries described above with different structures.

As part of processing these concept trees, the system may compare the nodes with values specified in domain lexicons e.g., based on string matching, and identify the "buyer" node 514 and the "personal address" node 516 as subcontext nodes; the "nevada" node 518 as an inverted index match concept; and the "sale" node 512 as a database attribute node that needs aggregation of data from two or more tables.

As explained above, a natural language query processing system may be limited to processing join paths based on concept trees having specific formations. For example, a natural language query processing system may be able to process only concept trees having subcontext nodes located at the parent level or on the 'ancestry' path from the root to the concept node, so that the dependency from the concept to these nodes can be properly established.

For example, consider the concept tree 502. The system needs to determine what the Nevada node corresponds to. The system can do so by looking at the subcontext nodes in its ancestry. However, the "personal address" node 516, which is a subcontext node, is not on the path from the root to the "nevada" node and that may keep the system from properly establishing that Nevada is the state of the address of buyer's personal address. There is a similar issue for the concept tree in 504, but this time the system may not be able to relate "buyer" subcontext node 514 when processing "nevada" node 516.

A natural language query processing system may transform the original structure of a concept tree into a different one that can be processed by the system. For example, a natural language query processing system may transform the concept tree 504 into the concept tree 508 by moving the "buyer" node 514 in the concept tree 504 one level closer to the root, which makes the "buyer" node 514 the parent node of the "personal address" node 516. In the transformed concept tree 508, the subcontext node 514 is located on the path to the root from node 518 and the system can now use 514 for processing 518.

One example tree transformation algorithm is as follows:
For each concept in the concept tree based on a breadth first traversal:
1. If the concept is not a subcontext concept, skip.
2. If this is a subcontext node:
   a. if the subcontext node does not have any children, or if its only descendents in the concept tree are subcontext nodes:
      i. Move the subcontext node up to be the parent of its parent.

Once the transform for moving up the subcontext nodes takes place the system generates the possible join lineages that these subcontexts represent. Generating the join lineages includes using another transform that results in subcontext concept nodes being augmented with one or more possible join lineages. If a non-subcontext node has a subcontext concept node as its parent, the system can verify if there is a single join lineage that is plausible for the attribute referenced in the node. If there are multiple plausible join lineages, the system can determine a malformed query.

An example transform to generate the possible join lineages is illustrated below as follows:

For each concept (C) in the concept tree based on a breadth-first traversal:
1. If the concept is not a subcontext concept, or not a database attribute concept, skip.
2. If the concept C is a database attribute concept (a direct reference to a database attribute), do the following (Let's assume the attribute is "a" of table "T")
   a. If the attribute does not have a subcontext associated with it, skip.
   b. For each Subcontext S (of table T) the attribute is in:
      i. If S does not have any foreign key attributes, skip
      ii. For each foreign key attribute (fk) in the subcontext S (there is a join mapping (T, fk, PT, pk):
         1. Add the join lineage "T:fk PT" to C.join_lineages
   c. Note that the database attributes can only add the first link of join lineages.
3. If the concept C is a subcontext concept:
   a. JoinsForSubcontext={ }. The subcontext of C is S. The table relevant to this subcontext is T
   b. For each foreign key attribute (fk) in the subcontext of the concept (there is a join mapping (T, fk, PT, pk), add the join mapping to JoinsForSubcontext.
   c. If JoinsForSubcontext is empty, we have nothing to do. This subcontext does not have any foreign keys in it.
   d. Check if parent of concept C (PC) is a subcontext node.
      i. If PC is not a subcontext or if it does not have any join_lineages stored, for each join mapping (T, fk, PT, pk) in JoinsForSubcontext:
         1. Add the join lineage "T:fk PT" to C.join_lineages
      ii. if PC has any join_lineages stored, for each join_lineage (J) in PC.join_lineages:
         1. Let "T1" be the first table in J and "TN" be the last. (Ex: If join lineage is "A::a B::b C", T1=A and TN=C)
         2. for each join mapping (T, fk, PT, pk) in JoinsForSubcontext:
            a. if TN==T, we extend J at the end with "TN::fk PT" and add it to C.join_lineages.
            b. if T1==PT we extend J at beginning with "T::fk" and add it to C.join_lineages.
         3. for each join mapping (T, fk, PT, pk) in JoinsForSubcontext:
            a. Add the join lineage "T:fk PT" to C.join_lineages For example, when processing the concept tree 506 shown in FIG. 5, a natural language query processing system, e.g., in a root-to-leaf fashion, finds the first attribute context node in the tree 506, following the "sale" node 512 to be the "buyer" node 514.

The "buyer" node 514 is specified for a BuyerSeller table and associated with the attribute "buyer_id," which is a foreign key to a person table. Based on this subcontext, the system determines that "BuyerSeller::buyer_id Person" is a join path and stores the join path in the "buyer" node 514. If more than one join path can be determined based on this subcontext for the "buyer" node 514, for example, when the "buyer" node 514 is associated with other foreign keys to other tables, the system may also store those join paths in the "buyer" node 514.

After processing the join path for the "buyer" node 514, the system can process the joins paths for the "personal address" node 516. Because the "personal address" node 516 is specified for the person table and associated with the column "personal_address_id," which is a foreign key to an address table, the system can determine if such a join path, e.g., "Person:: personal_address_id Address," has already been constructed and stored in the "buyer" node 514.

Figure 9:
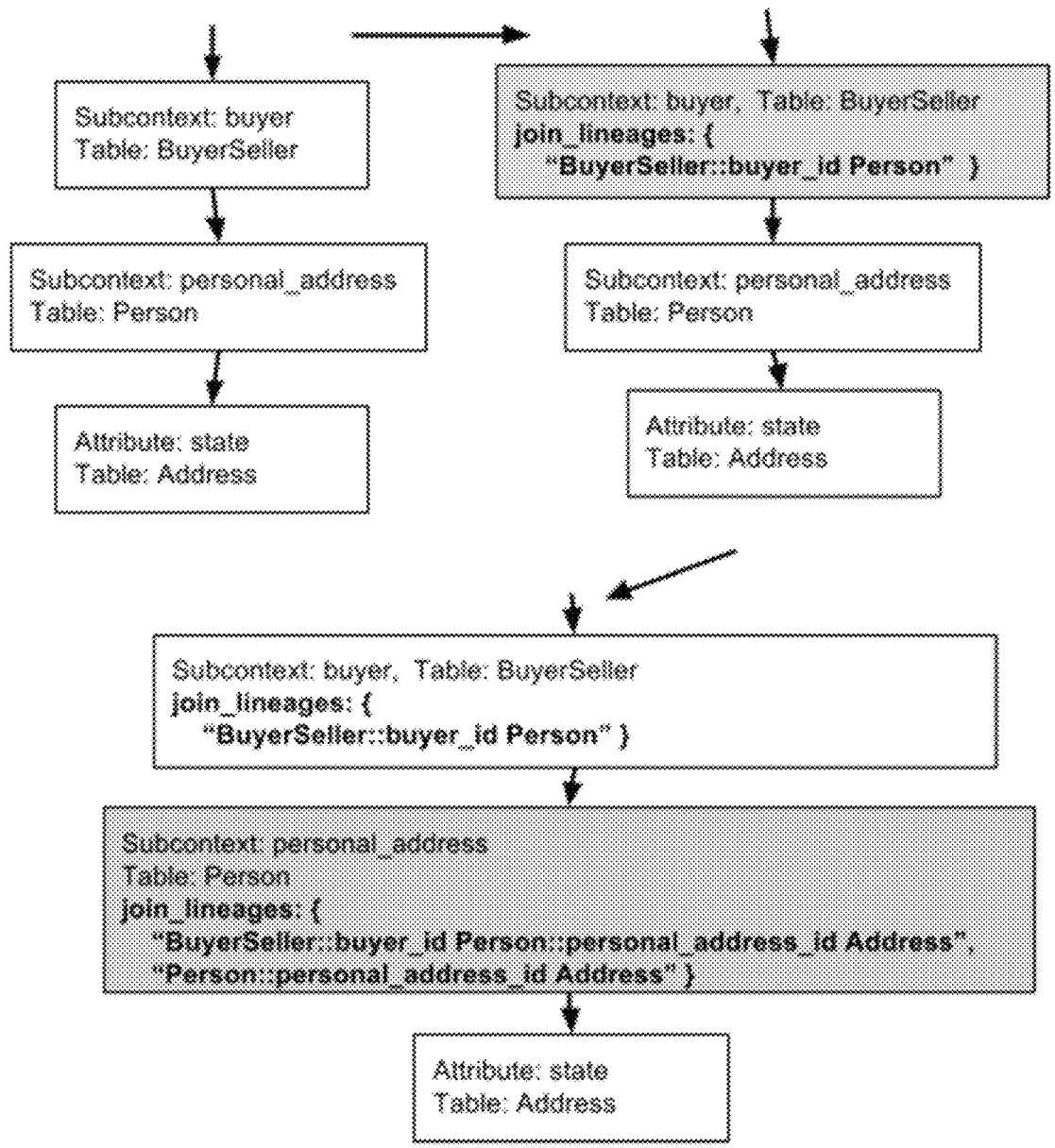
FIG. 9 is a flow diagram illustrating an example of processing join paths.

If there is an existing join path, the system can extend the existing join path if the table specified last in the existing join path matches the subcontext table specified in a new join path. In this example, because the table specified last in the join path "BuyerSeller::buyer_id Person" is the Person table, which matches the subcontext table person in the new join path "Person:: personal_address_id Address," the existing join path can be extended into "BuyerSeller::buyer_id Person::personal_address_id Address." When more than one existing path can be similarly extended, the system may also extend those join paths. The above example of processing join paths and extending existing join paths is illustrated in FIG. 9.

The algorithm for hypergraph creation goes through all of the tables and their attributes based on the schema lexicons and join mappings. It is possible to have very comprehensive lexicon coverage for tables with a large number of attributes. However, a given query can reference just a small subset of these lexicons in general. The system can perform significant pruning over the tables and attributes to ensure that the generated hypergraph is trimmed to a shape and form that is complete in the way it captures all tables, attributes, and join mappings that are relevant to the original natural query. The pruning can provide an optimization that simplifies the hypergraph significantly.

A preliminary step to pruning includes finding all referenced tables and attributes in the concept tree. This can be done by performing the following operations. The resulting output is a set of referenced tables and a set of referenced tabled attributes.

1. For every concept in the concept tree (the order of traversal does not matter)
   a. Find referenced table(s) in the concept (if any) and insert the referenced table(s) to the set of referenced tables.
   b. Find referenced attributes(s) in the concept (if any) and insert the referenced attribute(s) to a set of referenced table attributes.

An example pruning algorithm is illustrated below as follows:

A. Prune the leaf nodes of the Join tree.
   a. bool pruned_node=true
   b. while pruned_node:
      i. pruned_node=false
      ii. if there is a leaf node N where N.table is not in the set of referenced tables (computed with the algorithm above):
         1. remove all incoming edges to N from the tree. This is a leaf node so there are no outgoing edges;
         2. remove node N from the tree; and
         3. pruned_node=true. (Note that the algorithm may iterate until it finds unreferenced leaf nodes; and that pruning leaf nodes may generate new leaf notes as a result).

B. Prune the root node of the tree.
   a. while ROOT.table is not in the set of referenced tables and ROOT has only one outgoing edge:
      i. make N the node that ROOT connects to with its only edge.
      ii. remove the outgoing edge of ROOT and the node ROOT.
      iii. make N the new ROOT.

Matching Hypergraph Nodes to Attribute References

Based on a concept tree, a natural language query processing system can construct new join paths or extend existing join paths.

The system can construct a new join path or extend an existing join path, based on concepts that correspond to attributes of foreign tables. At the end, for a properly formed query, the system matches each attribute concept to a single join path, which makes it possible to translate this attribute reference into SQL in an unambiguous way. One example process for this is presented in the following:

1. Create a map that maps the attribute paths to Hypernodes. Note that attribute paths are unique for each Hypernode. Let's call this NodeMap.
2. For convenience, create another map that has the count of hyperedges that correspond to a particular table. Remember that there maybe multiple hyperedges created for a table as there may be different join paths that lead to that table. Let's call this map as HyperedgeCount.
3. For each concept (C) in the concept tree based on a breadth-first traversal:
   a. Find the attribute referenced in this concept C. (If there are more than one attributes are referenced, we repeat the steps below for each of them). Assume this is T.x (attribute x of table T).
   b. If (HyperedgeCount[T]==1) then it means there is no ambiguity for the attribute reference. We find that hyperedge (H) and set the full attribute path for the attribute reference in concept (C) as H.join_lineage+"x". There is a single Hypernode that matches this attribute reference as well.
   c. If (HyperedgeCount[T]>1) we need to find which one is relevant. We go to the parent node of concept C. Let's refer to the parent node as PC.
      i. If PC.join_lineages is empty, we will be unable to uniquely identify the full attribute path. This means the query is malformed, an error message is generated and presented to the user.
      ii. If PC.join_lineages is not empty, we try to find a unique match to a Hypernode for the attribute reference.
         1. hypernode_matches={ }
         2. For each join_lineage in PC.join lineages that end with T (we skip the others as we are trying to check for possible attribute paths for T.x)
            a. Generate the attribute_path for T.x as (join lineage+"x"). Lookup this attribute in NodeMap to check if it actually corresponds to a HyperNode. If so, add the node to hypernode_matches.
         3. if hypernode_matches is still empty, it means we will be unable to uniquely identify the full attribute path. This means the query is malformed, an error message is generated and presented to the user.
         4. if hypernode_matches has more than 1 elements, it means that the system is unable to uniquely identify the full attribute path. This means the query is malformed, an error message is generated and presented to the user.

5. if hypernode_matches has a single element, then we found our matching Hypernode uniquely.

Returning to the example query "what is the total sales for buyers who have their personal address in Nevada?" described above that results in the concept tree depicted in FIG. 5 element 508 after all the concept tree transformations are applied. Node 512 corresponds to the unambiguous "sale" attribute of BuyerSeller table. Node 514 and Node 516 are subcontext concept nodes augmented with join lineages. Node 518 is an inverted index match for the State column in the address table. Here, there are multiple instances of the address table, e.g., the buyer's personal address, the seller's personal address, the buyer's business address and seller's business address and the node 518 could match the state attribute to any one of these table instances.

The system determines which one of these address table instances is actually referenced. This is done by checking if the parent node (516) has the join path that can be used. Node 516 has the join path "BuyerSeller::buyer_id Person::personal_address_id Address" which allows the system to identify a unique match for node 518 to the state of buyer's personal address, removing the ambiguities associated with the concept for "nevada".

The resulting query is:

SELECT SUM(BuyerSeller.sales_usd) AS alias0_sales_usd
FROM BuyerSeller
INNER JOIN Person ON (BuyerSeller.buyer_id= Person.person_id)
INNER JOIN Address ON (Person.personal_address_id= Address.address_id)
WHERE Address.state=Nevada.

In some implementations, a method for disambiguating join paths for natural language queries includes the followings steps:
1. First, subcontext transformations are applied
   a. Moving Subcontext Leaf Nodes Up Transform
   b. Subcontext Join Lineage Transform
2. Finding All Referenced Tables and Attributes.
3. Generating the Join Tree for Tables.
4. Pruning the Join Tree.
5. Hypergraph Creation is done for only the remaining tables in the Join Tree and the join mappings between the tables in this set.
   a. For step (2.c) we generate nodes for only the columns that are referenced in the query.
6. Matching Hypergraph Nodes to Attribute References.
7. Marking Hypernodes that are matched and running hypergraph reduction (using known techniques) to further prune the hypergraph.
8. Generate the table aliases for each Hyperedge and then generate joins from the Hypergraph.

Figure 6:
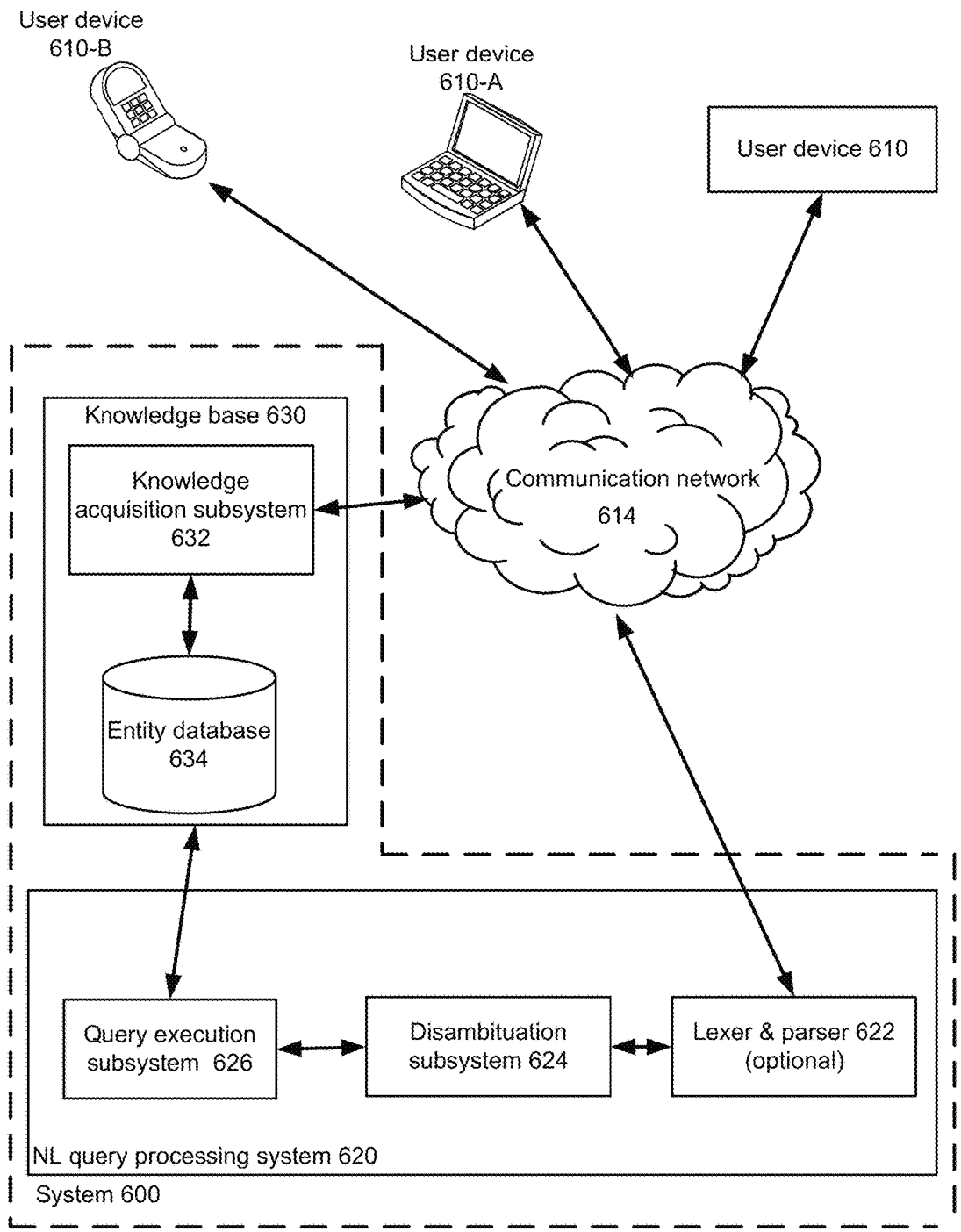
FIG. 6 is a block diagram illustrating an example system for disambiguating join paths for natural language queries.

FIG. 6 is a block diagram illustrating an example system 600 for disambiguating join paths for natural language queries. The system 100 includes a natural language (NL) query processing system 620 and a knowledge base 630. In some implementations, the knowledge base 630 is a data source upon which natural language queries are executed.

The NL query processing system 620 includes: an optional lexer and parser 622, a disambiguation subsystem 624, and a query execution subsystem 626; the knowledge base 630 includes a knowledge acquisition module 632 and an entity database 634.

The system 600 receives natural language queries originating from one or more user devices 610, e.g., a smart phone 610-B or a laptop 610-A, and converts the natural language queries into structured operations, e.g., programming statements, to be performed on application programming interfaces (APIs) of the knowledge base 630. After obtaining query results, the system 600 provides them back to the one or more user devices 610.

The NL query processing system 620 processes natural language queries, e.g., plain English queries, received from user devices 610 into structured operations e.g., SQL queries, executes these operations on the API of the knowledge base 630 to produce queries results, and returns the query results to the user devices 610.

The optional lexer and parser 622 processes natural language queries into tokens and further into syntax trees, which are also referred to as concept trees in this specification. The lexer and parser 622 may also transform, e.g., change the structure of, a concept tree into another concept true with a different structure.

The disambiguation subsystem 624 disambiguates natural language queries based on join paths stored on nodes of a concept tree.

The query execution subsystem 626 generates structured queries based on the output of the disambiguation subsystem 624 and the lexer and parser 622. The query execution subsystem 626 further executes the structured queries on the APIs of the knowledge base 630 to produce query results.

The knowledge base 630 provides structured APIs for use by users to query and update the entity database 634.

The knowledge acquisition subsystem 632 obtains, from external sources, e.g., the Internet, additional entity information and stores it in association with existing entity information in the entity database 634 and according to the data schema of the knowledge base. The knowledge acquisition subsystem may communicate directly with external sources, bypassing the NL frontend 620.

The entity database 634 stores entity information, i.e., information about entities, e.g., dates of birth of people, addresses for businesses, and relationships between multiple organizations. The entity information is stored in the entity database 634 according to a data schema. In some implementations, the entity database 634 stores entity information using a table structure. In other implementations, the entity database 634 stores entity information in a graph structure.

A data schema is generally expressed using a formal language supported by a database management system (DBMS) of the entity database. A data schema specifies the organization of entity information as it is logically constructed in the entity database, e.g., dividing entity information into database tables when the entity database is a relational database.

A data schema can include data representing integrity constraints specific to an application, e.g., which columns in a table the application can access and how input parameters should be organized to query a certain table. In a relational database, a data schema may define, for example, tables, fields, relationships, views, indexes, packages, procedures, functions, queues, triggers, types, sequences, materialized views, synonyms, database links, directories, XML schemas, and other elements.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interaction interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A Method comprising:
   obtaining a natural language query from a user;
   converting the natural language query into structured operations to be performed on structured application programming interfaces (APIs) of a knowledge base, including:
      identifying one or more tokens in the natural language query;
      generating a tree specifying dependency relationships among the identified tokens in the natural language query;
      generating a graph based on the tree and a data schema of the knowledge base, the graph having multiple join paths that each specify a directional relationship among elements within the knowledge base that correspond to the identified tokens in the natural language query;
      responsive to detecting a linguistic ambiguity due to the inclusion of a particular identified token in multiple join paths in the graph, wherein a token included in the natural language query has two or more interpretations:
         resolving the linguistic ambiguity by selecting one of the multiple join paths specified by the graph, wherein the selected join path corresponds to an interpretation of the token from among the two or more interpretations of the token;
      using the natural language query in accordance with the selected interpretation of the token, to generate one or more structured operations;
   identifying search results by performing the one or more structured operations on the structured APIs of the knowledge base; and
   returning the search results to the user in response to the natural language query;
   wherein the knowledge base is implemented on one or more computers and one or more storage devices storing instructions to produce operation results based on structured operations; and
   wherein the knowledge base stores information associated with entities according to the data schema and has the APIs for programs to query the knowledge base.

2. The method of claim 1, wherein the join path includes identifiers of at least two tables that share a common column.

3. The method of claim 2, wherein the join path further includes one or more identifiers of the common column.

4. The method of claim 3, wherein resolving the linguistic ambiguity by selecting an interpretation of the token, from the two or more interpretations of the token, based on the multiple join paths specified by the graph includes:
   determining that the token matches a value specified in a first column of a first table in the at least two tables; and
   based on the determining, identifying the token as referring to a value specified in a second column of a second table in the at least two tables.

5. The method of claim 1, wherein converting the natural language query into structured operations to be performed on structured application programming interfaces (APIs) of a knowledge base includes:
   obtaining parser output generated by a parser, the parser output representing the natural language query; and
   generating a concept tree in accordance with the parser output, wherein subcontext concept nodes are located on a level of the concept tree that is no closer to the root of the concept tree than any attribute node is.

6. The method of claim 5, wherein obtaining parser output includes processing the natural language query into tokens.

7. The method of claim 5, wherein the structured operations are generated based on the concept tree and the selected interpretation of the token.

8. A computing system comprising:
   one or more computers; and
   one or more storage units storing instructions that when executed by the one or more computers cause the computing system to perform operations comprising:
   obtaining a natural language query from a user;
   converting the natural language query into structured operations to be performed on structured application programming interfaces (APIs) of a knowledge base, including:
      identifying one or more tokens in the natural language query;
      generating a tree specifying dependency relationships among the identified tokens in the natural language query;
      generating a graph based on the tree and a data schema of the knowledge base, the graph having multiple join paths that each specify a directional relationship among elements within the knowledge base that correspond to the identified tokens in the natural language query;
      responsive to detecting a linguistic ambiguity due to the inclusion of a particular identified token in multiple join paths in the graph, wherein a token included in the natural language query has two or more interpretations:
         resolving the linguistic ambiguity by selecting one of the multiple join paths specified by the graph, wherein the selected join path corresponds to an interpretation of the token, from among the two or more interpretations of the token;

using the natural language query in accordance with the selected interpretation of the token, to generate one or more structured operations;

identifying search results by performing the one or more structured operations on the structured APIs of the knowledge base; and returning the search results to the user in response to the natural language query;

wherein the knowledge base is implemented on one or more computers and one or more storage devices storing instructions to produce operation results based on structured operations; and wherein the knowledge base stores information associated with entities according to the data schema and has the APIs for programs to query the knowledge base.

9. The system of claim 8, wherein a join path includes identifiers of at least two tables that share a common column.

10. The system of claim 9, wherein the join path further includes one or more identifiers of the common column.

11. The system of claim 10, wherein resolving the linguistic ambiguity by selecting an interpretation of the token, from the two or more interpretations of the token, based on the multiple join paths specified by the graph includes:

determining that the token matches a value specified in a first column of a first table in the at least two tables; and based on the determining, identifying the token as referring to a value specified in a second column of a second table in the at least two tables.

12. The system of claim 8, wherein converting the natural language query into structured operations to be performed on structured application programming interfaces (APIs) of a knowledge base includes:

obtaining parser output generated by a parser based on the natural language query; and generating a concept tree in accordance with the parser output, wherein subcontext concept nodes are located on a level of the concept tree that is no closer to the root of the concept tree than any attribute node is.

13. The system of claim 12, wherein obtaining parser output includes processing the natural language query into tokens.

14. The system of claim 12, wherein the structured operations are generated based on the concept tree and the selected interpretation of the token.

15. A non-transitory computer storage medium encoded with a computer program, the computer program comprising instructions that when executed by a system cause the system to perform operations comprising:

obtaining a natural language query from a user;

converting the natural language query into structured operations to be performed on structured application programming interfaces (APIs) of a knowledge base, including:

identifying one or more tokens in the natural language query;

generating a tree specifying dependency relationships among the identified tokens in the natural language query;

generating a graph based on the tree and a data schema of the knowledge base, the graph having multiple join paths that each specify a directional relationship among elements within the knowledge base that correspond to the identified tokens in the natural language query;

responsive to detecting a linguistic ambiguity due to the inclusion of a particular identified token in multiple join paths in the graph, wherein a token included in the natural language query has two or more interpretations:

resolving the linguistic ambiguity by selecting one of the multiple join paths specified by the graph, wherein the selected join path corresponds to an interpretation of the token from among the two or more interpretations of the token;

using the natural language query in accordance with the selected interpretation of the token, to generate one or more structured operations;

identifying search results by performing the one or more structured operations on the structured APIs of the knowledge base; and returning the search results to the user in response to the natural language query;

wherein the knowledge base is implemented on one or more computers and one or more storage devices storing instructions to produce operation results based on structured operations; and wherein the knowledge base stores information associated with entities according to the data schema and has the APIs for programs to query the knowledge base.

16. The non-transitory computer storage medium of claim 15, wherein a join path includes identifiers of at least two tables that share a common column.

17. The non-transitory computer storage medium of claim 16, wherein the join path further includes one or more identifiers of the common column.

18. The non-transitory computer storage medium of claim 17, wherein resolving the linguistic ambiguity by selecting an interpretation of the token, from the two or more interpretations of the token, based on the multiple join paths specified by the graph includes:

determining that the token matches a value specified in a first column of a first table in the at least two tables; and based on the determining, identifying the token as referring to a value specified in a second column of a second table in the at least two tables.

19. The non-transitory computer storage medium of claim 15, wherein converting the natural language query into structured operations to be performed on structured application programming interfaces (APIs) of a knowledge base includes:

obtaining parser output generated by a parser based on the natural language query; and generating a concept tree in accordance with the parser output, wherein subcontext concept nodes are located on a level of the concept tree that is no closer to the root of the concept tree than any attribute node is.

20. The non-transitory computer storage medium of claim 19, wherein obtaining parser output includes processing the natural language query into tokens.

* * * * *

UNITED STATES PATENT AND TRADEMARK OFFICE
CERTIFICATE OF CORRECTION

PATENT NO. : 10,282,444 B2
APPLICATION NO. : 15/261556
DATED : May 7, 2019
INVENTOR(S) : Bozkaya et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this
Nineteenth Day of May, 2020

Andrei Iancu
*Director of the United States Patent and Trademark Office*